May 9, 1933.  C. F. HOOFER  1,907,813
AIR CONTROL FOR PNEUMATIC LUBRICATING SYSTEMS
Filed May 5, 1930  2 Sheets-Sheet 1
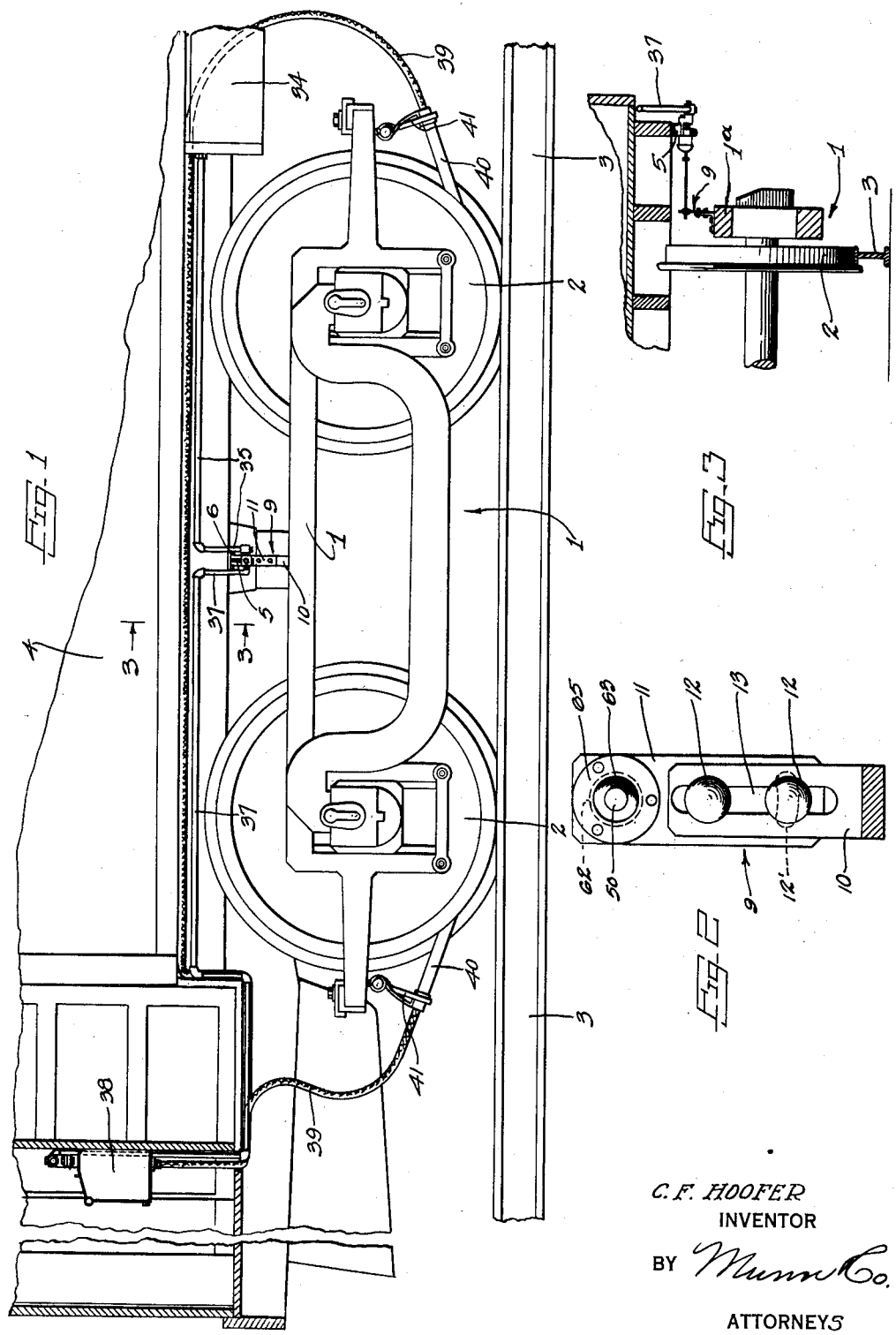
C. F. HOOFER
INVENTOR
BY *Munn & Co.*
ATTORNEYS

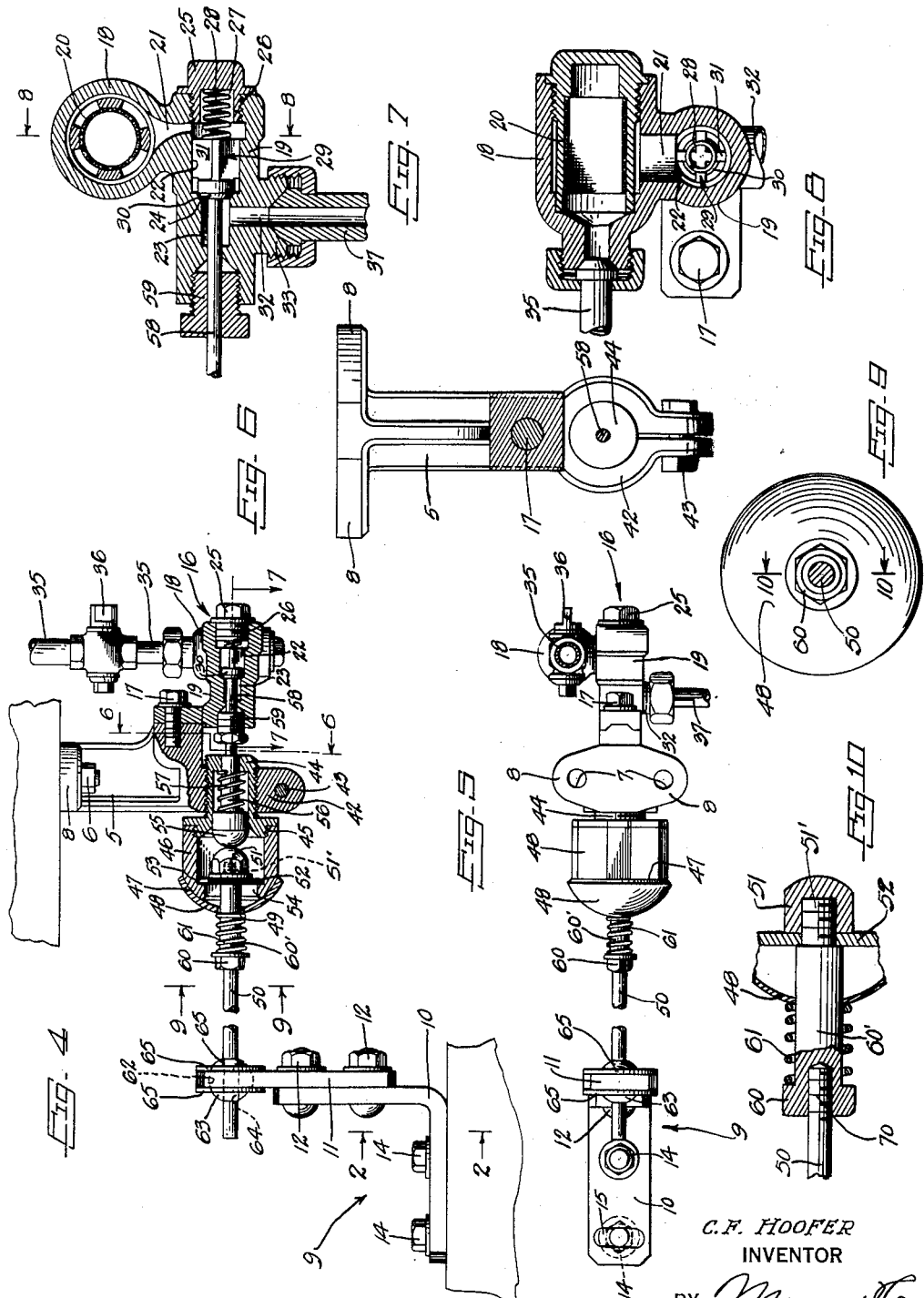

Patented May 9, 1933

1,907,813

UNITED STATES PATENT OFFICE

CHARLES F. HOOFER, OF CHICAGO, ILLINOIS

AIR CONTROL FOR PNEUMATIC LUBRICATING SYSTEMS

Application filed May 5, 1930. Serial No. 449,960.

My invention relates to improvements in air controls for pneumatic lubricating systems, and it consists in the combinations, constructions, and arrangements herein described and claimed.

An object of my invention is to provide an air control for a pneumatic lubricating system in which certain improvements are embodied over the type set forth in my prior Patent No. 1,278,657 of September 10, 1918. One of the features in the present invention is the provision of a novel air control lever for regulating air under pressure and in which the lever is arranged to be operated automatically by the relative movement between certain parts of a car, locomotive, or the like, to which the device is attached.

A further object is to provide an air control device having adjustable supporting means whereby the control means may be centered with respect to the diverse motions between the truck and the frame or car body of the vehicle.

A further object is to provide a device of the character described which is adapted for utilizing within predetermined limits swinging motions in all directions for operating the control means.

A further object is to provide a device of the type described in which the control lever may be moved in an oscillating manner and in which means is provided for easily and quickly adjusting the lever to function efficiently under changed or changing conditions.

A further object is to provide a device of the type described in which the moving parts are protected from dirt and the like, thereby insuring accuracy and efficiency in operation.

A further object is to provide a device of the type described in which means is provided for attachment to the truck of a vehicle and an element for attachment to the body of the vehicle whereby relative movement between the two attached elements controls the air under pressure, which, in turn, positively feeds a lubricant to the flanged wheels associated with the truck.

Other objects and advantages will appear in the following specification, and the novel features of the invention will be particularly pointed out in the appended claims.

My invention is illustrated in the accompanying drawings, forming part of this application, in which Figure 1 is a side elevation of a truck and a car, partly in section, showing my invention in connection with a lubricating system for oiling the flanges of the wheels, Figure 2 is a sectional view taken along the line 2—2 of Figure 4, Figure 3 is a sectional view taken substantially along the line 3—3 of Figure 1, Figure 4 is a side elevation, partly in section, of my invention, Figure 5 is a top plan view, partly in section, of the structure shown in Figure 4, Figure 6 is a sectional detail view taken along the line 6—6 of Figure 4, Figure 7 is a sectional view taken along the line 7—7 of Figure 4, Figure 8 is a sectional view taken along the line 8—8 of Figure 7, Figure 9 is an enlarged sectional detail view taken along the line 9—9 of Figure 4, and Figure 10 is an enlarged detail view of a portion of my control rod.

In carrying out my invention, I make use of a truck 1 provided with a center casting 1a and having flanged wheels 2 arranged to run upon rails as indicated at 3. A portion of a street railway car 4 is mounted upon the truck. The car is partly shown in section for exposing a portion of the lubricating system which will be defined hereinafter.

While I have defined the invention in the present instance as being shown in combination with a street railway car, it will be understood of course that other types of cars as well as locomotives and the like may be similarly provided with my invention.

In Figures 1, 3 and 4 I have shown a bracket 5 as being mounted upon a portion of a car through the medium of bolts 6. The bolts may be passed through openings 7, see Figure 5, in the flanged portions 8 of the bracket. A companion bracket 9 may be secured to the center casting 1a of the truck 1 and in operative relation with the bracket 5 as shown in Figures 1 and 3. The companion bracket comprises portions 10 and 11 which may be rigidly secured together by means of bolts 12. The portion 10 is provided with a slot 13 through which the bolts 12 project, see Figure 2. This construction permits the portion 11 to be adjusted toward or away from the truck. In other words, the portion of the bracket 9 which projects upwardly from the truck may be lengthened or shortened as required. The portion 10 is preferably secured to the truck by means of bolts 14, see Figure 3. The bolts pass through openings in that part of the portion which rests upon the truck. One of the openings is in a sense a slot, as indicated at 15 in Figure 5. It will thus be seen that the bracket may be pivoted about one of the bolts 14 as an axis for aligning the bracket 9 with the bracket 5, as will be more fully explained later. In Figure 2 I have shown the portion 11 as being provided with a slot 12' through which one of the bolts 12 projects. This construction permits the portion 11 to be oscillated about the other of the bolts 12 for adjusting purposes.

In Figures 4 and 5 I have shown a valve body 16 as being secured to the bracket 5 by means of cap screws 17. The valve body comprises portions 18 and 19. The portion 18 is hollow in construction for receiving a screen 20. The hollow portion 18 is in communication with the interior of the portion 19 by reason of a passageway 21. The portion 19 is provided with openings 22 and 23 of different diameters for providing a shoulder or valve seat 24.

One end of the opening 22 may be closed by means of a cap 25. The latter is provided with a threaded portion 26 for engaging the threaded portion of the opening 22. The cap is recessed as at 27 for accommodating one end of a spring 28. The opposite end of the latter bears against a valve 29. The valve is provided with a seat-engaging portion 30 and a flanged structure 31 which engages the spring 28. Movement of the valve in the direction of the cap 25 permits a fluid to pass around the valve. The portion 19 is provided with a passageway 32 in a threaded extension 33. The passageway communicates with the opening 23, which, in turn, communicates with the opening 22. The latter, in turn, communicates with the opening 21.

The portion 18 of the valve body 16 is in communication with an air reservoir 34, see Figure 1, through the medium of a pipe 35. The latter is connected with the valve body as shown in Figure 4. A suitable valve 36 may be associated with the pipe 35 for cutting off the air supply from the reservoir 34 whenever this may be desired. The air within the reservoir is of course under compression. A pipe 37, see Figures 1 and 7, is connected with the portion 19 of the valve body 16 and is in communication with the interior of the valve body as shown in Figure 7. The opposite end of the pipe is connected with an oil dispenser 38 which may be carried by the car or locomotive in any convenient location. The oil dispenser proper comprises a casing within which a lubricant is contained.

The casing is provided with a plurality of tubes or conduits 39 which lead to the individual wheels of the truck. Each conduit is provided with a distributor shoe 40. The discharge ends of the distributor shoes are yieldingly held in contact with the flanges of the wheels by reason of suitable hangers 41. The latter may be secured to the truck. The oil dispenser is preferably provided with an individual connection for each of the conduits 39.

I provide one conduit for each of the wheels. The compressed air from the reservoir 34 may be freed and thereby passed to the dispenser 38 which positively forces oil from the dispenser through the conduits 39. Since the dispenser forms no part of the present invention and is well known in the art, a detailed description is of course unnecessary. The manner in which the compressed air is controlled automatically will be defined later.

Let us now refer to Figures 4 and 5. The bracket 5 is provided with a threaded loop 42, see Figure 6, having bolt means 43 for rigidly securing a threaded extension 44 in position, see Figure 4. The extension is hollow and is threaded for engagement with the threads of the loop. The extension is provided with a threaded flange 45 arranged for closing one end of a casing 46. The opposite end of the casing is arcuate shape as at 47 and is closed by means of a cap 48 which conforms to the shape of the casing end and may be moved relatively thereto. The cap is provided with a central opening 49 through which a control rod 50 projects. The control rod is provided with a head 51 associated with a flange or washer 52. The flange 52 rests normally against a shoulder 53. The casing is provided with a relatively large opening 54 through which the control rod projects. The end of the head 51 is normally disposed in contact with a companion head 55 which is carried by a push rod 56. The latter and its head are normally held in engagement with the head 51 by reason of a coil spring 57.

The push rod and the spring are disposed within the extension 44. The valve 30 is associated with a valve rod 58 which passes through a packing nut 59 carried by the valve body 16. The control rod comprises in part a shaft portion 60' having a threaded opening for receiving the threaded end 70 of the remaining portion of the control rod 50, as shown in Figure 10. The shaft portion is provided with a flange 60 against which one end of a spring 61 bears. The opposite end of the spring bears against the cap 48. One end of the shaft portion 60' is threaded at 51' for connection with the head 51. This connecting feature also holds the flange 52 in rigid assembly with the head.

The portion 11 of the bracket 9, see Figure 4, is provided with an opening 62 within which a ball 63 is positioned. One end of the control rod 50 is slidably disposed within an opening 64 in the ball. A pair of retaining elements 65 may be secured to the sides of the portion 11 for holding the ball 63 in assembly with the portion 11. The ball is free to rotate.

From the foregoing description of the various parts of the device, the operation thereof may be readily understood. In referring to Figures 4 and 6, it will be noted that the valve 30 is normally positioned against its seat, whereby air under pressure from the tank 34 is prevented from passing through the valve body 16. The control rod 50 is arranged for oscillatory movement. This movement is brought about by the relative movement of the truck and the body mounted upon the latter.

Referring now to Figure 4, it will be noted that the disc 52 provides in a sense a fulcrum for the control rod. A slight movement of the control rod in any direction will of course cause the head 51 to move in the direction of the companion head 55. When the latter is moved, the valve 30 is opened.

At this time the compressed air from the reservoir 34 is free to pass into the pipe 37 which leads to the oil dispenser 38. The air pressure in the dispenser then forces a certain amount of oil into the conduits 39. In other words, I provide a positive feed for the lubricant and means for dispensing the oil upon the flanges of the wheels.

The control rod 50 is oscillated automatically, which of course provides an automatic oiling of the flanges. The device is easily and quickly mounted. The extension 44 may be adjusted for changing the influence of the movable control rod upon the valve 30. The adjustment may be made for permitting the valve 30 to open upon a slight movement of the control rod or the adjustment may be made for requiring a greater movement of the control rod before influencing the valve.

The cap 48 is held snugly in engagement with the arcuate-shaped end 47 which provides an inclosure for the mechanism within the casing. The portion 11 of the bracket 9 may be easily adjusted for aligning the control rod 50 in proper relation with the mechanism associated with the bracket 5. The control rod is influenced when the equipment to which the device is attached is passing around curves as well as while running upon a straight track. The reservoir is of course standard equipment incidental to air brake devices.

I claim:

1. In a device of the type described, a pair of attachable brackets, valve means carried by one of said brackets and having a compressed air inlet passageway and a compressed air outlet passageway communicating with the valve therein, a control rod slidably and pivotally connected with the other of said brackets and arranged for opening the valve when one of the brackets is moved relatively to the other, and means housing one end of the control rod and being threadedly connected to one of the brackets for adjusting the influence of the control rod upon said valve by varying the distance between the housed end of the control rod and the valve means.

2. In a device of the type described, a pair of attachable brackets, valve means carried by one of said brackets and having a compressed air inlet passageway and a compressed air outlet passageway communicating with the valve therein, a control rod slidably and pivotally connected with the other of said brackets and arranged for opening the valve when one of the brackets is moved relatively to the other, means for adjusting the influence of the control rod upon said valve, and a ball connection between the control rod and its associate bracket.

3. In a device of the type described, a pair of attachable brackets, valve means carried by one of said brackets and having a compressed air inlet passageway and a compressed air outlet passageway communicating with the valve therein, a control rod slidably and pivotally connected with the other of said brackets and arranged for opening the valve when one of the brackets is moved relatively to the other, means for adjusting the influence of the control rod upon said valve, and a ball connection between the control rod and its associate bracket, said last-named bracket comprising a plurality of parts adjustable with respect to each other.

4. In a device of the type described, a pair of attachable brackets, valve means carried by one of said brackets and having a compressed air inlet passageway and a compressed air outlet passageway communicating with the valve therein, a control rod slidably and pivotally connected with the other of said brackets and arranged for opening the valve when one of the brackets is moved vertically and sidewise with respect to the other, means for adjusting the influence of the control rod upon said valve, and a ball connection between the control rod and its associate bracket, said last-named bracket comprising a plurality of parts adjustable with respect to each other, said last-named bracket being also arranged for adjustment with respect to the other of said brackets.

Signed at Chicago in the county of Cook and State of Illinois this 29 day of April A. D. 1930.

CHARLES F. HOOFER.